2,794,043
PREPARATION OF ALIPHATIC NITRILES

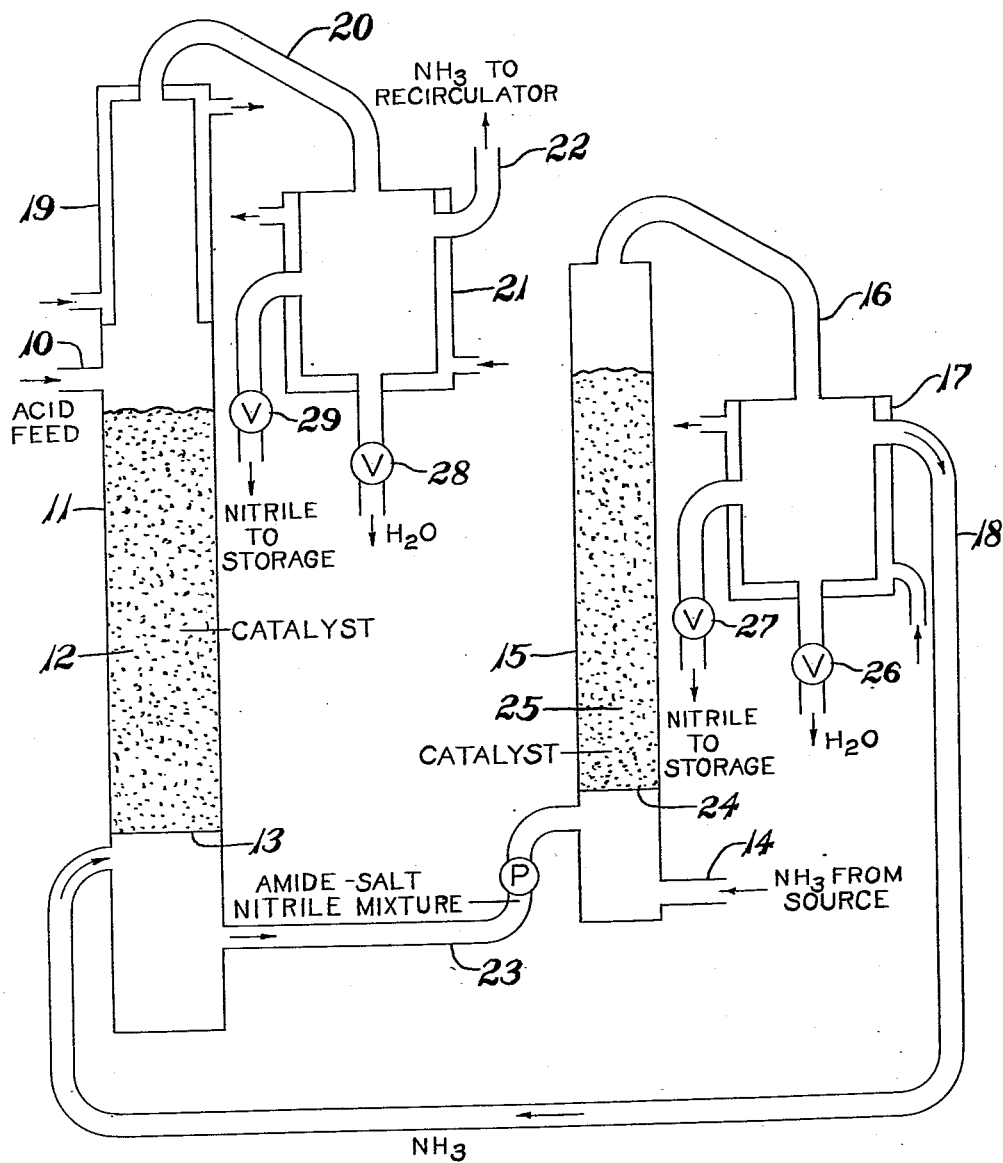

Jacob E. Jansen, Akron, and Max E. Roha, Brecksville, Ohio, assignors to The B. F. Goodrich Company, New York, N. Y., a corporation of New York Application January 13, 1955, Serial No. 481,534

6 Claims. (Cl. 260—465.2)

This invention relates to methods for preparing nitriles of higher aliphatic acids by reacting the acids with ammonia and dehydrating the ammonium salts, and more particularly refers to a two stage process in which the acid is converted to a mixture containing unreacted acid, ammonium salts, amides and nitriles in liquid phase in the presence of ammonia and a dehydration catalyst, and the mixture is then subjected to vapor phase conditions under the influence of a dehydration catalyst in the presence of ammonia to convert the acids, amides and ammonium salts to nitriles.

An object of this invention is the provision of a two step method for converting higher aliphatic acids to nitriles in the presence of a dehydration catalyst and ammonia, in which method both steps are carried out at atmospheric or autogenous pressure.

Another object is the provision of a method for converting higher aliphatic acids to nitriles, which method comprises converting the acids with ammonia to a mixture of amides, traces of ammonium salts, unreacted acids and nitriles in liquid phase in the presence of a dehydration catalyst in the first step and thereafter converting the mixture to nitriles in vapor phase in the presence of a dehydration catalyst and ammonia.

Still another object is the provision of a method for preparing nitriles from higher aliphatic acids with a small excess of ammonia by employment of a two step process in which the acids are first converted to a mixture of amides, trace of ammonium salts, unreacted acids and small quantities of nitriles in liquid phase in the presence of a dehydration catalyst and ammonia and then the mixture is subjected to vapor phase conditions in the presence of a dehydration catalyst and ammonia.

Numerous other objects will be apparent from the following description, which explains in detail the preferred form of the invention.

In the drawing is a schematic diagram of the invention showing the flow of materials during the steps in the process in which the ammonia is introduced into step 2 of the reaction system and then cycled through step 1.

The invention comprises reacting aliphatic acids containing from 8 to about 20 carbon atoms with a small molar excess of about 20% and not exceeding about 100% of the stoichiometric quantity of ammonia, in liquid phase in the presence of a dehydration catalyst at a temperature above the melting point of the aliphatic acid and below the boiling point of the nitrile, and preferably between about 200° C. and about 300° C., depending upon the acid employed, and removing the water from the reaction mixture by vaporization, then subjecting the reaction mixture resulting from step 1 to vapor phase conditions at a temperature of from about 300° C. to about 400° C. in the presence of a dehydration catalyst and ammonia in an amount greater than that required to saturate the water-of-reaction and condensing the vapor of nitrile and water. Each step of the method is carried out at atmospheric or autogenous pressure. The condensate separates into an aqueous phase which is saturated with ammonia and an organic phase which consists of substantially pure aliphatic nitriles. The reaction proceeds according to the general formula:

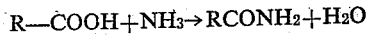
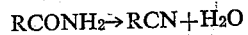

In the first step of the reaction the aliphatic acids which react with the ammonia are converted to a mixture containing mostly amides, with small amounts of ammonium salts, and small amounts of nitriles. Under the reaction conditions, however, a substantial proportion of the acids are unreacted. The water-of-reaction formed during the conversion of the acid to amide and nitrile is removed by vaporization, so that a substantially anhydrous mixture is fed into stage two of the reaction. The conversion of acid to amide occurs rather slowly, does not require any large excess of ammonia, and is effected at a lower temperature than the conversion of amide to nitrile in vapor phase. A contact time of approximately an hour between the ammonia and acid is needed to form appreciable quantities of amide, even in the presence of a dehydration catalyst. The conversion of amide to nitrile in vapor phase, however, is rather fast and can be effected in a matter of a few seconds to a few minutes at a temperature of about 300° C. or somewhat higher in the presence of a dehydration catalyst and sufficient ammonia to bind the water-of-reaction and thereby prevent a shift of equilibrium from the direction of nitrile formation back to amide due to the presence of free water. The small quantities of nitrile that enter stage two of the reaction are usually flashed off without further reaction. The ammonium salts that enter stage two are gradually converted to amides and then to nitriles. The free acids react with ammonia and are converted to amides, which are vaporized and further dehydrated to nitriles.

The methods of this invention effect a very substantial saving in the amount of ammonia in the system. The excess which amounts to about 0.2 to about 0.8 mole of ammonia for each mole of acid has several important indirect effects. Thus, since only relatively little volume of reactor space is occupied by the ammonia, it is possible to employ a smaller reactor to form a given quantity of amide, free acid, ammonium salt, nitrile mixture per unit time, or conversely, there will be a greater yield of the mixture for a given size reactor. Also, heat can be transferred more uniformly throughout the reactor, since there is a substantially higher ratio of liquid to gas in the reactor than is the case when large volumes of excess ammonia are utilized. This results in both an even distribution and a conservation of heat required in the reaction. Another advantage is the ease of temperature control in each step of the reaction which can be maintained at an optimum in each step, and, in the second step, charring of the products can be very effectively prevented by holding the temperature of the amide vaporizer slightly below or slightly above the boiling point of the amide and below optimum dehydration conditions, since the incoming ammonia will assist in vaporizing the amide even if the temperature is slightly below the boiling point of the amide. The catalyst containing section can be held at the optimum temperature conditions for nitrile formation. By this means very pure nitriles, free of soaps or other solid ingredients and having very light color can be formed.

The aliphatic acids which can be converted to nitriles by this process can be saturated or unsaturated acids having from 8 to 20 carbon atoms. This group of acids includes caprylic, pelargonic, capric, undecylinic, lauric, tridecylic, myristic, pentadecylic, palmitic, margaric, stearic, nonadecyclic, arachidic, behenic, linoleic, linolenic, oleic, therapinic, arachidonic, elaidic and other higher aliphatic acids normally found in natural fats and oils. The acids can be processed singly or in any combination. The preferred acids are those which result from hydrolysis of palm, coconut and soya bean oils.

The dehydration catalysts usually have acid characteristics and include such materials as activated alumina ($Al_2O_3$), phosphoric acid, zinc salts of organic and inorganic acids, titania gel, silica gel having about 99% or more $SiO_2$, acid clays and butyl stannoic acid. Of these catalysts those which are insoluble in the acids are preferred. Among the latter are titania gel, activated alumina, silica gel and acid clays. The most preferred catalysts are activated alumina and silica gel. All the preferred catalysts are solids which are insoluble in the reaction products. If desired, however, fatty acid-soluble catalysts can be employed. The latter include the zinc, copper and other heavy metal salts of fatty acids, specific examples of which are the zinc or copper salts of coconut oil fatty acids, soya bean fatty acids, stearic acid, palmitic acid, oleic acid, tallow acids and the like. These latter catalysts are liquid at the reaction temperatures.

The preferred solid catalysts are desirably in the form of pellets in a fixed bed, spaced from the bottom of the reactor to permit proper drainage of the liquid reactants without flooding the reactor or clogging flow lines. The catalyst can be supported on an inert solid such as carbon, glass beads, kieselguhr or other inert materials; it can be mixed with inert materials such as Berl saddles, or it can be present in the reactor in an unsupported, undiluted state.

One specie of catalyst can be used in the liquid phase step of the reaction and another in the vapor phase step if desired, or preferably, the same catalyst can be used for both steps.

Referring to the drawing, the method of practicing the invention is shown. Liquid fatty acids having from about 8 to about 20 carbon atoms are fed through line 10 into step 1 or amide forming reactor 11, which has previously been brought up to reaction temperature of 210–300° C. The acid is preferably fed into the reactor by means of a pump which is not shown. The fatty acids pass through a fixed catalyst bed 12 which is held above the bottom of the reactor 11 by a foraminous divider plate 13. Ammonia at the rate of from 1.2 to about 1.8 moles per mole of acid is fed into the system through inlet 14, by means of a pump (not shown). After reactor 11 is filled with liquid acids, the ammonia first circulates through step 2 or nitrile reactor 15, pipe 16, tank 17, into pipe 18 and into amide reactor 11. The ammonia flows in a direction counter to that of the liquid acids. Step one of the reaction occurs in reactor 11 under the influence of heat and catalyst. The acids are converted to a mixture containing mostly amide with a small proportion of nitriles and ammonium salts, together with unreacted acids. The reaction temperature of step one is maintained at about 210° C. to about 300° C. by means of external heat, which can be a circulating hot fluid in a jacket surrounding the catalyst chamber of reactor 11, it can be an electrical resistance type heating, it can also be a high frequency induction type heating medium or if desired the acids can be heated to reaction temperature before entering reactor 11. In the conversion of the acids to amide and nitriles, water is split out of the reacting molecule in accordance with the following formula:

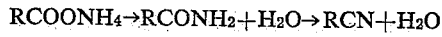

$$RCOONH_4 \rightarrow RCONH_2 + H_2O \rightarrow RCN + H_2O$$

It is essential in this invention to remove the water that is formed during this step of the reaction, without substantial separation of the remaining reactants. Thus, ammonia vapors, water vapors and traces of nitrile, ammonium salt and free fatty acid vapors pass upwards in reactor 11. The nitriles, ammonium salts and free fatty acids are substantially completely condensed on the walls of condenser 19, located at the top of reactor 11. The temperature of this condenser is kept at about 90–100° C. to permit water vapors to escape but to liquefy the organic vapors. Small quantities of nitrile vapors and substantially all the water vapors and the excess ammonia pass through pipe 20 into another condenser 21 where the water and nitrile vapors are condensed to a liquid state and the ammonia in excess of that required to saturate the water passes through outlet 22, after which it can be returned to the ammonia source or dried and recirculated. In the meantime, the nitriles, amides, ammonium salts and unreacted acids pass through the catalyst layer 12 of reactor 11 and flow to the second stage reactor 15 by means of conduit 23. In reactor 15, the mixture is heated to a temperature between about 300° C. and 400° C. depending upon the boiling point of the amide present. As stated above the temperature of the mixture need not be as high as the boiling point of the amide since the entering ammonia will assist in vaporizing the amide. Thus, the temperature of the acid-salt-nitrile-amide mixture can be from 100–125° C. below the boiling point of the amide and still be vaporized at a satisfactory rate by entrainment or solution in the ammonia vapors or if desired the temperature of mixture can be maintained at or near its boiling point. The nitrile which boils at a lower temperature than the amide passes through reactor 15 unchanged. The vaporized amide, free acids or ammonium salts, pass through the foraminous divider plate 24 and catalyst bed 25. Ammonia which enters this second stage reactor through pipe 14 moves upwardly through hot amide-acid-salt-nitrile mixture and passes upwardly through the catalyst bed 25 with the amide, ammonium salt and free acid vapors. The mixture is rapidly converted to nitrile and water which remain in the vapor state and pass out of the second stage reactor through pipe 16, into tank 17, which is jacketed to permit circulation of a cooling medium. The nitrile and water vapors are here condensed and the two liquids which are immiscible separate into an upper organic layer and a lower aqueous layer. The ammonia which is not absorbed by the water passes out of the tank through pipe 18 and is pumped into stage 1 reactor. Tank 17 has a valve 26 at its base to drain the aqueous part of the reacted materials and another valve 27 to drain off the nitrile. By proper adjustment of these valves the process can be run continuously for the entire life of the catalyst. Tank 21 has a construction similar to tank 17, and has spaced valves 28, 29 for separating water and nitrile, respectively. The nitrile produced by this method is very clear and free from suspended salts and acids, and the yields when the reaction temperatures are properly controlled are substantially quantitative.

Although the described method of making nitriles from fatty acids and ammonia discloses a system in which ammonia enters one reaction chamber and the excess is circulated through the other reaction chamber, it is obvious that each reaction chamber can have an independent ammonia entry and exit. The amount of ammonia entering each reactor can be regulated so that about equimolar quantities of ammonia and acid are introduced into the step 1 reactor and only sufficient ammonia to saturate the water vapors is permitted to enter the reactor of step 2.

The following examples disclose more fully the preparation of nitriles in accordance with the method of this invention, but they are not intended as limitations, for there are numerous variations in the proportions or types of fatty acids and operating conditions possible without departing from the teachings herein.

*Example I*

The first step reactor was heated to about 150° C. before adding any ingredients, and then liquid coconut oil fatty acids at the rate of 1.4 moles per hour were introduced into a reactor packed with ¼ in. pellets of activated alumina catalyst. Ammonia was pumped into the stage 2 reactor 15 at a rate of about 2.20 moles per hour. Heating of the reactor was continued, so that a temperature of about 250° C. was attained at approximately the time that the column was filled with acid. A temperature of 250° C. to 285° C. was maintained in the amide column 11 for the duration of the test. While the acid and ammonia were reacting in the step 1 reactor, the catalyst containing section of the column constituting step 2 reactor 15 was heated to a temperature between 325° C. and about 400° C. and maintained at about this range during the entire run. This reactor was packed with ⅛ in. cylinders of activated alumina. Usually an equilibrium or steady state is reached in about 1 to 2 hours. In this run totaling four hours, 5.59 moles of acid and 8.82 moles of ammonia were fed into the reactors. The condenser 19 in step 1 reactor was not used for this test. The amide stream entering step 2 reactor 15 had an acid content of from 20 to 25% by weight and the temperature of the mixture during this reaction step ranged from 284 to 291° C. A material balance showed a total conversion of acid to nitrile of about 88.7%. Only 3.9% nitrile was present in tank 21, which contained the condensate from the step 1 reaction, and the remainder of the nitrile resulted from the vapor phase dehydration in step 2 of the reaction. The water layer of step 1 contained 0.31 mole of salt, which amounts to 5.5% of the original acid present.

*Example II*

Coconut oil acids, containing a mixture of fatty acids having from 8 to 18 carbon atoms were fed into stage 1 reactor 11 which was packed with a 50–50 mixture of ¼ in. activated alumina and ¼ in. Berl saddles. The column was pre-heated to 150° C. with electric resistance wires and heating was regulated to bring the temperature of the reactor to 260–277° C. in a short time after starting the flow of the acids. The average acid feed rate was 1.24 moles per hour. Ammonia at a ratio of 1.82 moles for each mole of acid was introduced through stage 2 reaction and entered stage 1 reactor in a flow direction counter to that of the acids. The reflux condenser 19 at the top of the reactor was operated at a temperature of 90–100° C. While the acids and ammonia were undergoing reaction in step 1 of the process, the catalyst holding section of the reactor for step 2 containing activated alumina as the catalyst was heated to a temperature of 320° C. to 375° C. The amide stream from step 1 contained from 15% to 22% unreacted acids and the temperature of the amide during the vaporization stage was 280° C. to 296° C. At the end of a four hour run, the condensate from step 1 contained 0.4% nitrile based on the total acid feed and very small amounts of ammonium salts. Of the total water of reaction 74.9% was recovered from the first step. The condensate from step 2 of the reaction contained 92.8% nitrile based on the acid feed. The overall conversion of acid to nitrile was 94%.

*Example III*

Coconut oil fatty acids were fed into step 1 reactor and ammonia was fed into stage 2 reactor at a ratio of about 1.64 moles of ammonia for each mole of acid. The upper portion of the step 1 reactor was held at a temperature of 260° C. to 270° C. and the lower part between 265° C. and 275° C. The temperature of the water circulating through condenser 19 at the top of the step 1 reactor was 97–98° C. Only about 0.2% nitrile and about 0.5% salt passed through the top of the step 1 reactor under these conditions. The reaction mixture or amide stream from this first step contained between 15 and 20% acid as it entered the step 2 or vapor phase reactor and the temperature of the stream ranged from 292–306° C. during the vaporization stage. The lower section of the catalyst containing portion of this reactor had a temperature of 320–330° C. and in the upper section the temperature ranged from 350° C. to 375° C. The nitrile yield was 95.2%.

*Example IV*

In this test each reactor was half-filled with activated alumina pellets. Ammonia was fed into the stage 2 reactor, so that about 1.7 moles were introduced for each mole of coconut oil acid entering stage 1 reactor. The temperature in the upper part of the reactor for step 1 was maintained between 110° C. and 135° C., while that in the lower part of the reactor was kept at 270° C. to 275° C. The mixture entering step 2 contained about 35 to 39% acid. In the reactor for step 2, the vaporization temperature of the mixture ranged from 286° C. to 303° C. The temperature in the catalyst holding portion of stage 2 reactor was held at 355° C. to 370° C. throughout the entire catalyst section. The condenser at the top of the step 1 reactor was maintained at 98–99° C. Under these conditions no nitrile was recovered from step 1 condensate but about 55% of the total water-of-reaction was present in this stage of the process. Only about 0.4% of the acid was recovered as salt which was about equally distributed between the condensates of each step of the reaction. The remainder of the acid was all converted to nitrile.

*Example V*

As in Example IV, each reactor was half-filled with activated alumina pellets. Ammonia was fed through step 2 reactor at a ratio of 1.54 moles for each mole of coconut oil acids. The temperature of the top half of the catalyst containing section of step 1 reactor was 115° C.–145° C. and that of the lower half was 267° C.–275° C. The amide stream leaving step 1 reactor had a free acid content ranging from 25.8% to about 44% by weight of the mixture. The vaporization temperature of the mixture in step 2 was 301° C.–304° C. The catalyst holding section of the step 2 reactor had a temperature of 350° C.–370° C. The condenser at the top of the reactor for step 1 was maintained at a temperature of 96° C.–97° C. No nitrile was recovered in the condensate from step 1 of the reaction and the total nitrile recovered was 97.6% based on the acid entering the reaction.

*Example VI*

The stage 1 reactor was filled to 100% of its capacity with activated alumina and the stage 2 reactor held only about 50% of its capacity of the same catalyst. Coconut oil fatty acids were fed into the stage 1 reactor at a rate of 1.25 moles per hour and the ammonia was introduced into stage 2 reactor at a rate of 2.28 moles per hour. The temperature in the upper part of stage 1 reactor was maintained at about 250° C.–270° C. over an eight hour period. The temperature in the lower part of this reactor was held at 270° C.–275° C. The condenser temperature at the top of the reactor was 89° C.–99° C. About 3.8% nitrile was recovered in the condensate from step 1. The amide stream entering stage 2 contained from about 15 to about 20% acid and the vaporization temperature was 292° C.–302° C. In stage 2, the temperature at the top of the reactor was 345° C.–365° C. and that in the lower part was 355° C.–370° C. Under this reaction condition the conversion of the fatty acids to nitriles was substantially quantitative.

*Example VII*

For comparative purposes, a run was made in which the amide or step 1 reactor was filled with ¼ in. Berl saddles. The ammonia flow was maintained at a rate of 2 moles per hour. Condenser 19 was maintained at a temperature of about 95–99° C. The water formed in the reaction was liquefied in condenser 21. Coconut oil fatty acids were fed through stage 1 reactor 11 at the rate of 0.6 mole per hour over a period of 1⅔ hours. Thus, the ammonia to acid ratio was about 3 to 1. The reaction temperature in stage 1 reactor 11 was maintained at 250° C. during the entire test period. Analysis of the amide-acid-nitrile mixture showed that only 0.89 mole was converted to nitrogen containing derivatives during the entire period. This indicates that only about 26.7% of the ammonia was utilized in the reaction.

The Berl saddles in the amide or step 1 reactor were replaced with activated alumina. This was the only change made in the procedure. Temperature conditions and ammonia flow rate were the same as those described above. In a period of 70 minutes 1.84 moles of the same coconut oil fatty acids as those described above were fed into the reactor. The average ammonia to acid ratio was 1.27 to 1. Analysis of the amide-acid-nitrile mixture passing through pipe 23 showed that 1.47 moles of acid were converted to nitrogen containing derivatives. Of the total ammonia entering the reactor 63.1% was utilized in the reaction.

From these examples it is apparent that the reaction efficiency of the ammonia is vastly increased in the two step process for converting fatty acids to their corresponding nitriles. The ammonia is introduced into the step 2 reactor where only a small proportion is reacted, but where it also serves to prevent a shift of equilibrium to the left in the reaction $RCONH_2 \rightarrow RCN + H_2O$. In this step of the reaction which is carried out in vapor phase, the total ammonia consumed is that which is needed to react with the unreacted acids that enter step 2 reactor plus that which is needed to saturate the water vapor resulting from the dehydration. The unreacted ammonia after passing through step 2 of the reaction is introduced into step 1 where it reacts with acids entering the step 1 reaction chamber in a direction of flow counter to that of the ammonia to convert a large preponderant portion of the acids to amides, in accordance with the following formula:

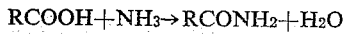

$$RCOOH + NH_3 \rightarrow RCONH_2 + H_2O$$

This part of the conversion is carried out in liquid phase. The presence of molar equivalents of water vapor and amide does not tend to shift the equilibrium to the left under the conditions of the reaction.

The presence of a dehydration catalyst in both the liquid and vapor phase steps results in an extremely efficient means of combining the ammonia with the fatty acids and converting the reaction product thereof to a dehydrated derivative.

If the ammonia is first introduced into step 1 it will react to form amides by dehydration of the ammonium salts, the ammonia and water vapors are carried into step 2 of the reaction. Consequently, the total amount of water vapor that is present in step 2 of the reaction is that which results from dehydration of the amides to nitriles plus that which is introduced with the ammonia. The presence of such relatively large proportions of water requires a huge excess of ammonia to overcome the tendency toward reversal of the dehydration reaction. Stated differently, the presence of excess water vapor in admixture with nitrile vapor tends to cause the nitrile to hydrolyze. To avoid this hydrolysis, the ammonia ratio is increased to about 5 or more moles of ammonia to each mole of acid in the conventional one step methods of converting fatty acids to nitriles.

The nitriles are useful for the preparation of primary amines and carboxyl substituted amines, the latter being excellent detergents.

It is thought that the invention and many of its attendant advantages will be understood from the foregoing description, and it will be apparent that various changes can be made in the nature of the ingredients and reaction conditions without departing from the spirit and scope of the invention, as the illustrative examples describe the preferred embodiment thereof.

We claim:

1. The method of preparing nitriles from aliphatic acids and ammonia in a two step process, step 1 comprising reacting higher aliphatic acids and ammonia in liquid phase in the presence of a dehydration catalyst at a temperature above the melting point of said acids and below the boiling point of the nitriles to form water and a mixture of amides, nitriles, unreacted acids and ammonium salts and removing the water of reaction substantially as rapidly as it is formed, step 2 comprising passing the substantially anhydrous liquid mixture into a second reactor and completing the conversion of said mixture to nitriles under vapor phase conditions in the presence of excess ammonia and a dehydration catalyst; said ammonia being introduced into the vapor phase step of the process in a ratio of from about 1.2 to about 2.0 moles of ammonia for each mole of acid and being thereafter cycled through the liquid phase step of the process.

2. The method of claim 1 in which the ratio of ammonia ranges from about 1.5 to about 1.8 moles for each mole of acid.

3. The method of claim 1 in which the dehydration catalyst is insoluble in the aliphatic acids.

4. The method of claim 3 in which the dehydration catalyst is activated alumina.

5. The method of claim 1 in which the liquid phase step of the process is carried out at a temperature between about 200° C. and about 300° C.

6. The method of claim 1 in which the vapor phase step of the process is carried out at a temperature between about 300° C. and about 400° C.

References Cited in the file of this patent

UNITED STATES PATENTS

| | | |
|---|---|---|
| 2,132,849 | Greenewalt et al. | Oct. 11, 1938 |
| 2,314,894 | Potts et al. | Mar. 30, 1943 |
| 2,414,393 | Potts | Jan. 14, 1947 |
| 2,448,275 | Potts | Aug. 31, 1948 |
| 2,590,986 | MacLean et al. | Apr. 1, 1952 |
| 2,732,397 | Hull | Jan. 24, 1956 |